United States Patent Office 2,770,741
Patented Nov. 13, 1956

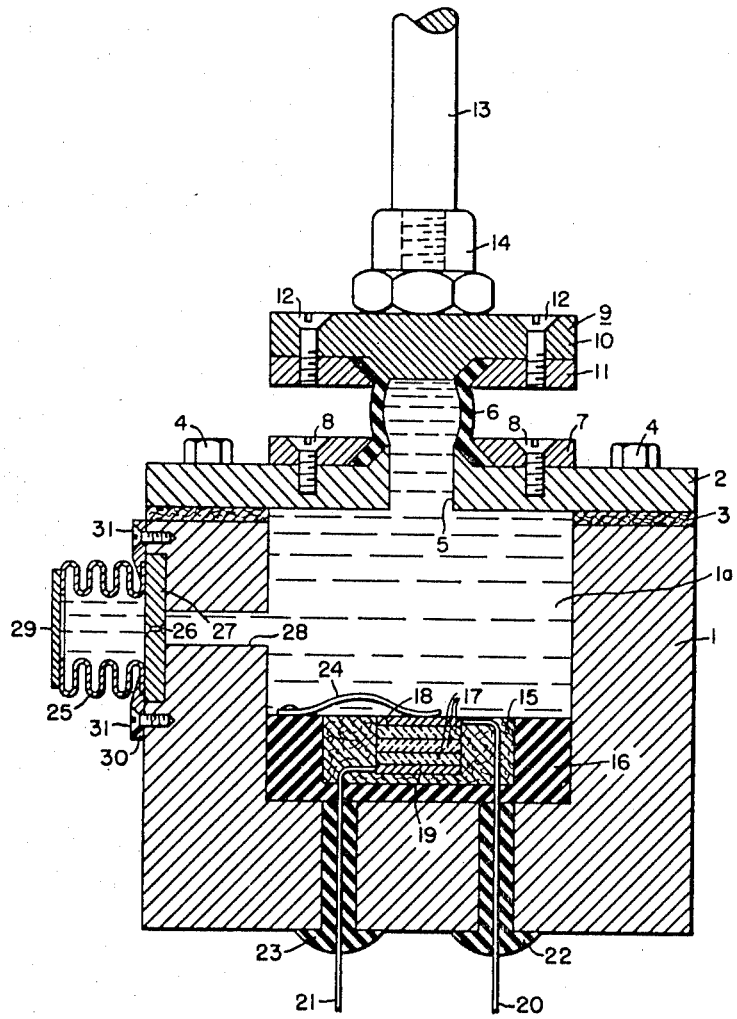

2,770,741

VIBRATION PICKUP

Milton P. Vore, Catonsville, Md., and Herbert M. Kroft, Venice, Calif., assignors to Westinghouse Electric Corporation, East Pittsburgh, Pa., a corporation of Pennsylvania Application March 4, 1953, Serial No. 340,318

7 Claims. (Cl. 310—8.7)

This invention relates generally to vibration pickups, and more particularly to such pickups which respond to amplitudes or displacements of vibration.

One application of vibration pickups is in the field of balancing machines used to balance rotating parts. This application requires simple, rugged pickups capable of converting a reasonably high percentage of the available mechanical energy of vibration into an electrical quantity.

Pickups of the class generally suited to such applications are described in U. S. Patents 2,534,918 and 2,571,899, the first of which in Fig. 7 illustrates a pickup which is presently used. This pickup comprises a rigid, fluid filled, cup-shaped body sealed by a flexible diaphragm, to the center of which diaphragm a prod is attached. A pressure sensitive electrical transducer is immersed in the fluid in the cup-shaped body to be subjected to fluid pressure variations due to axial displacement of the prod, which in practice is connected to, or abuts, the vibrating body and transmits the force or motion, due to vibration, to the diaphragm and the fluid, which in turn stresses the transducer. Such a transducer may be of the form of a piezoelectric crystal.

In the application illustrated in the mentioned patents, and other similar applications, a resonant condition may be found at certain frequencies in the balancing range. The resonant system consists simply of the mass of the part being balanced plus its supporting members and the spring constant of the pickup or pickups. Upon the occurrence of resonance, the pickup output is not an accurate indication of the force (unbalance for instance) which causes the vibration. It is desirable that this resonance occur at frequencies appreciably below the balancing range. This lowering of the resonant frequency can be achieved in several ways, including increasing the mass of the workpiece and/or its supports, and by decreasing the spring constant of the vibration pickup. The first of these alternatives is not always practical or desirable.

In the diaphragm type of pickup described above, when the prod is pushed down, it displaces a volume of fluid equal to the product of the effective prod area times the distance the prod is displaced. The displaced fluid causes the diaphragm around the prod to bulge up and stress the diaphragm. With the displacement of the prod the internal fluid pressure increases due to the stress of the diaphragm, and a restoring force exists on the prod equal to the increase in pressure times the effective area of the prod. The energy expended in pushing the prod down is stored as potential energy of stress in the diaphragm and in compression of the fluid and crystal. A more detailed quantitative analysis of this action will indicate that since the diaphragm is very flexible in comparison with the compressibility of the fluid only a very small portion of this potential energy is stored in the compression of the fluid. Since the basic operating principle of this pickup is that displacements are converted into fluid compression changes which are then converted by a piezoelectric crystal into electrical signals, it is then apparent that this diaphragm type of pickup converts only a very small portion of the energy delivered to it into an electrical signal.

The aforesaid alternative of reducing the spring constant of the pickup may be practiced with the diaphragm type of pickup described above by using a thinner or more elastic diaphragm, but this reduces the change in internal pressure due to a given prod displacement in about the same proportion as the spring constant is decreased. Since a pressure sensitive electrical transducer such as a piezoelectric crystal is used to detect vibration displacements, the pickup sensitivity is decreased in about the same proportion as the spring constant. This might be compensated over a limited range by increasing the size of the crystal, but if the spring constant is to be reduced by a factor of about 25, a crystal 25 times as large as that formerly used would be required. Such a crystal is extremely expensive, relatively unavailable and would increase the pickup dimensions beyond practical limits.

A theoretically ideal pickup is illustratable in connection with a frictionless, prod actuated, leakproof piston in a non-yielding cylinder in which the fluid is confined entirely by non-yielding walls. In this ideal construction, all of the energy used in displacing the prod is stored as potential energy of compression of the fluid and crystal. A pickup so made would have the highest possible efficiency of conversion of energy of prod displacement into an electrical output signal. Since the restoring force on the prod is equal to the fluid pressure change times the area of the prod, the ratio of the restoring force to prod displacement, that is, the spring constant of the pickup, could be made any desired value by proper choice of the area of the piston. A more detailed quantitative analysis can be made which shows that a pickup made in this manner could have the desired low spring constant and considerably more than the required sensitivity, while utilizing the same crystal element as utilized in the diaphragm type pickup. It would, however, involve the practical difficulty of making an oil-tight but frictionless piston and cylinder, and the ability to move the prod practically unrestrained in directions perpendicular to its axis, which as highly desirable in a vibration pickup to be used for balancing, would be sacrificed.

Accordingly, it is one object of this invention to provide a vibration pickup having certain physical similarities to the ideal type described above.

Another object of this invention is to provide a pickup of the character referred to in the preceding object which is simple with respect to operational requirements and positive in operation.

Yet another object of this invention is to provide a vibration pickup of the type referred to, having a sufficiently low spring constant that mechanical resonance is below the frequency of the vibration it is to be used to detect.

It is also an object of this invention to provide a vibration pickup which converts a reasonably high percentage of the mechanical energy of vibration to electrical energy.

Another object of this invention is to provide a vibration pickup which permits lateral displacement of the actuating prod without causing or adversely affecting pickup response.

A further and more specific object of this invention is to provide a vibration pickup in which the actuating prod is coupled to the pickup in such a way that the area of the fluid displaced is relatively small.

In the use of vibration pickups of the character generally referred to, it has been found that relatively small changes in temperature cause undesirable changes in the sensitivity of the pickup. This change in sensitivity is due to the fact that the pickup body and the fluid with which it is filled have different coefficients of thermal expansion.

An increase in temperature, for instance, causes the fluid to expand much more than the pickup body. The extra volume of fluid causes the yieldable connection of the prod to the pickup body to expand and bulge. The increased stress in this material, for instance the rubber in the diaphragm mentioned above, is usually many thousands of times more than the change in stress caused by the vibrations which the pickup is intended to measure. Rubber and similar materials do not obey Hooke's Law perfectly over such a wide range of stress. Therefore, the sensitivity of the pickup which is proportional to the ratio between incremental prod displacement due to vibration and incremental change in fluid pressure, varies with the static stress or "pre-load" of the yieldable rubber member.

Accordingly, a further object of this invention is to provide a pickup of the character generally referred to in which change in sensitivity due to temperature change is minimized.

More in particular, it is an object of this invention to provide a pickup for detecting vibrations in whch provision for volumetric change with temperature is made.

Specifically stated, it is an object of this invention to provide a fluid filled vibration pickup having a resilient auxiliary chamber which accommodates the expanding fluid.

The foregoing statements are merely illustrative of the various aims and objects of this invention. Other objects and advantages will become apparent from a study of the following specification when considered in conjunction with the accompanying drawings, in which the single figure thereof illustrates a vibration pickup embodying the principles of this invention.

The vibration pickup illustrated in the drawing comprises a substantially rigid cup-shaped body portion 1 which is sealed by a rigid cover 2 which seats upon a gasket 3 fitted over the upper end of the body 1. The volume thus enclosed is filled with a suitable liquid 1a. The cover may be secured in place by means of bolts 4 to provide for convenient removal. Cover 2 is provided with a small opening 5, therein about which the lower end of a rubber tube 6 is fitted. The rubber tube 6 is clamped in fluid-tight relation with the face of the cover about opening 5 by means of a clamp 7, which is secured to the cover by means of screws 8 extending through clamping ring 7 and threading into blind holes in the cover 2. The upper end of the rubber tube 6 is sealed over by a prod mount, generally designated 9, which comprises a plate 10 to which the upper end of rubber tube 6 is securely clamped by means of a clamping ring 11 secured by screws 12. A prod 13 threads into a nut 14 secured to the plate 10. The free end of prod 13 is adapted to engage a vibrating body.

With the equipment thus far described, it will be appreciated that displacement of the prod 13 applies force to the end of a column of fluid, the area of which is determined by the inside diameter of the rubber tube. This force is applicable to this column of liquid by reason of the resilience of the rubber tube 6. As described in connection with the theoretically ideal type of pickup, the diameter of rubber tube 6 may be made sufficiently small that the spring constant may be sufficiently low for the intended application. It will be noticed that there is a marked similarity between this construction and the aforesaid theoretically ideal construction in which compression force was applied to the fluid by means of the frictionless leak-proof piston. The losses in the present pickup per se will be due primarily to the energy loss in deflecting the rubber tube. Such a tube may be made, if desired, quite resilient in an axial direction and stiffened appreciably against radial expansion by circumferential reinforcing strands (not shown) which may be molded in the rubber tube during manufacture. Such reinforcing need not be bulky and need not occupy a large percentage of the axial dimension of the rubber tube, in which case the resiliency of the tube in compression, or tension, and in lateral directions will not be materially reduced. On the other hand, if radial expansion of the rubber tube may be tolerated to some extent, such reinforcing need not be used.

The pressure sensitive electrical transducer is mounted in a cavity 15 in an electrical insulating member 16 which is mounted in the bottom of the cup-shaped body 1. Such pressure sensitive element may be a piezoelectric crystal comprising a stack of crystal plates 17 whose end faces are covered by electrodes 18 and 19. Respective leads 20 and 21 are connected to the respective electrodes and brought through the body 1 in any convenient location by means of respective insulating bushings 22 and 23 which are fitted in fluid-tight relation to the respective leads 20 and 21 and to the body 1. The space between the crystal assembly and insulating member 16 may be filled with resilient padding material permeable to the liquid, for instance spun glass, and the stack may be secured in position by means of a leaf spring 24 secured to the insulating member at one end and bearing upon the upper electrode 18 of the crystal stack. This bearing pressure need not be high but need be only sufficient to hold the crystal in the position indicated and prevent excessive movement thereof. Alternatively the entire space within the container may be filled with a loose mass of spun glass or the like material with the crystal mounted therein in which case the insulating body 16 or retaining spring 24 would not be necessary.

Temperature compensation is achieved by providing a flexible chamber such as a metallic bellows 25 which communicates with the cavity of the pickup body across an orifice 26 of capillary dimensions, or other opening offering a high resistance to fluid flow, which is formed in a plate 27 fitted over the end of a hole 28 through the pickup body. Bellows 25 has one end thereof sealed by means of a plate 29 and its open end is fitted in fluid-tight relation on plate 27 about orifice 26. This connection is secured by means of a clamping ring 30 secured by screws 31 which thread into blind holes in the pickup body.

The important characteristic of orifice 26 is that it have a high resistance to fluid flow so that the time constant of it and the variable volume chamber be long compared to the period of vibration. This high resistance to fluid flow may be achieved by other means than capillary dimensions. For instance, communication between the two chambers could be through a series of baffles, or a labyrinth or a series of bends of relatively large bore, through filtering mediums, etc.

The fluid 1a in the pickup body completely fills all of the cavities extending up into and completely filling the tube 6 and extending through hole 28 and orifice 26 into and completely filling the bellows 25. The axial characteristic of the bellows 25 to deflection is essentially that of a very soft spring. Hence, its change in volume, due to a change in fluid pressure within it, is many times greater than that of the pickup body closed by the resilient tube 6 or, alternatively, a diaphragm. As a consequence in the case of increasing temperature the expanding fluid flows through the orifice 26 into the bellows 25 which easily expands to accept the increasing volume of fluid. The change in stress in the bellows in expanding is very small. Consequently, the change in fluid pressure is correspondingly small. Hence, the change in sensitivity of the pickup is scarcely appreciable and does not effect its calibration to any real extent.

The communicating orifice 26 between the bellows and the pickup body is so small, however, that the volume of fluid that can flow through it during a half cycle of the vibration being measured is very small compared to the volume of fluid displaced by the prod. In effect, the entire change of pressure in the cavity of body 1 during the half cycle of vibration, appears as a pressure drop across the orifice 26. Thus, change in fluid volume, due to temperature change which takes place rather slowly, is taken up by the bellows without changing the "preload" of the yieldable member of the pickup appreciably. Hence, the action of the pickup in measuring vibrations in the intended frequency range, that is, its sensitivity, is not changed materially.

Although but one embodiment of this invention has been herein illustrated, it will be appreciated by those skilled in the art that various substitutions of equivalents may be made for the rubber tube 6, for the bellows 25, and for the orifice 26 without departing from the spirit and scope of this invention which provides for the application of force to the fluid of the pickup over a limited area and which further incorporates an arrangement to provide for volumetric change with temperature. Under these circumstances it is intended that the foregoing disclosure and the showing made in the drawing are to be construed only as illustrative of the principles of this invention and not interpreted in a limiting sense.

We claim as our invention:

1. A vibration pickup comprising, a rigid hollow pickup body having an opening therein, an electrical pressure sensitive transducer disposed in said pickup body, a flexible fluid-tight tubular member of small cross-sectional area relative to the cross-sectional area of the hollow portion of said hollow pickup body, said flexible tubular member being flexible in an axial direction and being stiff circumferentially to minimize changes in cross-sectional area of the flexible tubular member with variations in fluid pressure therewithin, a clamp means securing one end of said tubular member to said pickup body in fluid tight relation about said opening, a prod mount connected to and sealing the other end of said tubular member, and a relatively incompressible fluid filling said hollow pickup body and said tubular member.

2. A vibration pickup comprising, a rigid hollow pickup body having an opening therein, an electrical pressure sensitive transducer disposed in said pickup body, a fluid-tight flexible tubular member having one end secured in fluid tight relation to said body about said opening and being of small cross-sectional area relative to the cross-sectional area of the hollow portion of said hollow pickup body, said flexible tubular member being flexible in an axial direction and being stiff circumferentially to minimize changes in cross-sectional area of the flexible tubular member with variations in fluid pressure therewithin, actuator means connected to and sealing the other end of said tubular member, and a relatively incompressible fluid filling said hollow pickup body and said tubular member.

3. A vibration pickup comprising, a rigid hollow pickup body having an opening therein, an electrical pressure sensitive transducer disposed in said pickup body, a fluid-tight resilient tube connected in fluid tight relation to said body about said opening and being of small cross-sectional area relative to the cross-sectional area of the hollow portion of said hollow pickup body, said resilient tube being resilient axially and being stiff circumferentially to minimize variations in cross-sectional area of said tube with fluid pressure variations therewithin, actuator means connected to and sealing the other end of said resilient tube, and a fluid medium filling said hollow pickup body and said resilient tube.

4. A vibration pickup comprising, a rigid hollow pickup body having an opening therein, an electrical pressure sensitive transducer disposed in said pickup body, a fluid-tight resilient tube connected at one end in fluid tight relation to said body about said opening and being of small cross-sectional area relative to the cross-sectional area of the hollow portion of said hollow pickup body, said resilient tube being resilient axially and being stiff circumferentially to minimize variations in cross-sectional area of said tube with fluid pressure variations therewithin, actuator means connected to and sealing the other end of said resilient tube, and a relatively incompressible fluid filling said hollow pickup body and said resilient tube.

5. A vibration pickup comprising, an open-end container having a cup-shaped rigid portion and a rigid cover portion having an opening therein, a fluid-tight resilient tube being sealed at one end to said cover portion about said opening and being of small cross-sectional area relative to the cross-sectional area of said cup-shaped rigid portion, said resilient tube being flexible in an axial direction and being stiff circumferentially to minimize changes in cross-sectional area of said resilient tube with fluid pressure variations therewithin, actuator means connected to and sealing the other end of said resilient tube, an electrical pressure sensitive transducer disposed in said cup-shaped portion, and a fluid filling said cup-shaped portion and said resilient tube.

6. A vibration pickup comprising, a rigid hollow body having a first opening therein and a fluid flow restricting opening therein, a fluid-tight flexible tubular member having one end sealed to said body about said first opening and being of small cross-sectional area relative to the cross-sectional area of the hollow portion of said hollow body, said flexible tubular member being flexible in an axial direction and being stiff circumferentially to minimize changes in cross-sectional area thereof with changes in fluid pressure therewithin, actuator means connected to and sealing the other end of said flexible tubular member, a flexible variable volume chamber having an opening therein sealed to said body about said fluid-flow restricting opening, a pressure sensitive electrical transducer disposed in said hollow body, and a fluid completely filling said hollow body, said flexible variable volume chamber and said flexible tubular member, said actuator means being adapted for engagement with a vibrating body to axially deflect said flexible tubular member and produce pressure variations in said fluid medium in synchronism with the vibratory movement of said vibrating body to correspondingly control said electrical transducer, said fluid flow restricting opening preventing appreciable fluid flow between said variable volume chamber and said hollow body during short time fluid pressure changes due to vibration and permitting fluid flow between said variable volume chamber and said hollow body during longer time fluid pressure variations resulting from temperature changes.

7. A variation pickup comprising, a substantially rigid hollow body having a main opening and a fluid flow restricting opening therein, a fluid-tight resilient tube having one end connected to and sealed to said body about said main opening and being of small cross-sectional area relative to the cross-sectional area of the hollow portion of said hollow body, said resilient tube being resilient in an axial direction and being stiff circumferentially to minimize changes in cross-sectional area thereof with changes in fluid pressure therewithin, actuator means connected to and sealing the other end of said resilient tube, a bellows having a closed end and an open end sealed to said body about said fluid flow restricting opening, a pressure sensitive electrical transducer disposed in said hollow body, and a fluid completely filling said hollow body, said bellows and said resilient tube, said actuator means being adapted for engagement with a vibrating body to axially deflect said resilient tube and produce pressure variations in said fluid medium in synchronism with the vibratory movement of said vibrating body to correspondingly control said electrical transducer, said fluid flow restricting opening preventing appreciable fluid flow between said variable volume chamber and said hollow body during short time fluid pressure changes due to vibration and permitting fluid flow between said variable volume chamber and said hollow body during longer time fluid pressure variations resulting from temperature changes.

(References on following page)

References Cited in the file of this patent

UNITED STATES PATENTS

| | | |
|---|---|---|
| 2,490,216 | Jaffe | Dec. 6, 1949 |
| 2,569,987 | Frondel | Oct. 2, 1951 |
| 2,571,899 | Kroft | Oct. 16, 1951 |
| 2,587,482 | Keller | Feb. 26, 1952 |
| 2,626,992 | Holman | Jan. 27, 1953 |

FOREIGN PATENTS

| | | |
|---|---|---|
| 745,611 | France | Feb. 21, 1933 |